(12) United States Patent
O'Sullivan (10) Patent No.: US 10,967,221 B2
(45) Date of Patent: Apr. 6, 2021

(54) DEVICE AND METHOD FOR MONITORING EXERCISE PERFORMANCE

(71) Applicant: James L. O'Sullivan, New Taipei (TW)

(72) Inventor: James L. O'Sullivan, New Taipei (TW)

(*) Notice: Subject to any disclaimer, the term of this patent is extended or adjusted under 35 U.S.C. 154(b) by 314 days.

(21) Appl. No.: 15/806,546

(22) Filed: Nov. 8, 2017

(65) Prior Publication Data

US 2018/0147448 A1 May 31, 2018

Related U.S. Application Data

(60) Provisional application No. 62/427,176, filed on Nov. 29, 2016.

(51) Int. Cl.
*A63B 24/00* (2006.01)
*A63B 71/06* (2006.01)
*G09B 19/00* (2006.01)

(52) U.S. Cl.
CPC ...... *A63B 24/0062* (2013.01); *A63B 24/0006* (2013.01); *A63B 71/0686* (2013.01); *G09B 19/0038* (2013.01); *A63B 2024/0009* (2013.01); *A63B 2024/0068* (2013.01); *A63B 2220/12* (2013.01); *A63B 2220/20* (2013.01); *A63B 2220/30* (2013.01); *A63B 2220/40* (2013.01); *A63B 2220/62* (2013.01); *A63B 2220/803* (2013.01); *A63B 2220/836* (2013.01); *A63B 2225/50* (2013.01)

(58) Field of Classification Search
CPC ............ A63B 24/0062; A63B 24/0006; A63B 71/0686
See application file for complete search history.

(56) References Cited

U.S. PATENT DOCUMENTS

| | | | | |
|---|---|---|---|---|
| 4,371,945 | A * | 2/1983 | Karr ...................... | G01C 22/006 235/105 |
| 8,187,182 | B2 * | 5/2012 | Kahn ................... | A61B 5/1038 600/300 |
| 8,562,489 | B2 * | 10/2013 | Burton .................... | G04F 10/00 482/9 |

(Continued)

FOREIGN PATENT DOCUMENTS

WO 2001042809 A2 6/2001

*Primary Examiner* — Xuan M Thai
*Assistant Examiner* — Sadaruz Zaman (57) ABSTRACT

A device and method for monitoring exercise performance and configured to be worn on a limb of a user. The device includes a position determining module configured to generate position data for a present exercise session of the user utilizing one or more signals; a motion sensor configured to detect motion of the device and generate motion data; and a processor. The processor is operable to calculate at least one of speed, pace, and distance of the device; calculate a limb motion of the user to obtain limb motion data throughout the present exercise session; determine whether an inaccurate interval is present during the present exercise session; obtain a matching interval; and replace at least one of the speed, pace, and distance data during the inaccurate interval with a corresponding at least one of speed, pace, and distance data of the matching interval.

17 Claims, 3 Drawing Sheets

(56) References Cited

U.S. PATENT DOCUMENTS

| | | | |
|---|---|---|---|
| 8,628,453 B2* | 1/2014 | Balakrishnan | A63B 71/0686 482/1 |
| 8,702,430 B2* | 4/2014 | Dibenedetto | G16H 40/67 434/247 |
| 8,775,120 B2* | 7/2014 | Molettiere | A61B 5/0002 702/160 |
| 9,011,293 B2* | 4/2015 | Shavit | A63B 71/0622 482/8 |
| 9,522,317 B2* | 12/2016 | Bleich | A63B 69/0028 |
| 9,662,560 B2* | 5/2017 | Riley | A63B 24/0006 |
| 10,300,334 B1* | 5/2019 | Chuang | G16H 50/30 |
| 2004/0102931 A1* | 5/2004 | Ellis | G16H 20/40 702/188 |
| 2009/0234614 A1* | 9/2009 | Kahn | G02C 5/001 702/141 |
| 2009/0319221 A1* | 12/2009 | Kahn | A61B 5/1123 702/141 |
| 2011/0003665 A1* | 1/2011 | Burton | G04F 10/00 482/9 |
| 2012/0116550 A1* | 5/2012 | Hoffman | A63B 24/0084 700/91 |
| 2013/0079906 A1* | 3/2013 | Crowley | A61B 5/1124 700/91 |
| 2013/0184843 A1* | 7/2013 | Ellis | G16Z 99/00 700/94 |
| 2014/0200847 A1* | 7/2014 | Singiresu | G01C 22/006 702/141 |
| 2014/0228989 A1* | 8/2014 | Tagliabue | A63B 24/0062 700/91 |
| 2014/0270375 A1* | 9/2014 | Canavan | A61B 5/1124 382/103 |
| 2015/0100141 A1* | 4/2015 | Hughes | A61B 5/1118 700/92 |
| 2015/0141873 A1* | 5/2015 | Fei | G01C 22/006 600/595 |
| 2015/0151161 A1* | 6/2015 | Anderton | A61B 5/103 700/91 |
| 2016/0345891 A1* | 12/2016 | Kirby | G16H 40/63 |
| 2019/0240534 A1* | 8/2019 | Black | A63B 24/0006 |

* cited by examiner

DEVICE AND METHOD FOR MONITORING EXERCISE PERFORMANCE

CROSS REFERENCE TO RELATED APPLICATIONS

This application claims the benefit of priority to U.S. provisional patent application No. 62/427,176, filed Nov. 29, 2016, and entitled, "DEVICE AND METHOD FOR MONITORING EXERCISE PERFORMANCE", the disclosure of which is hereby incorporated by reference in its entirety.

BACKGROUND

Technical Field

The present disclosure relates to a device and method for monitoring exercise performance. More particularly, the present disclosure relates to a device and method for monitoring exercise performance, in which user motion information is used in conjunction with position information to accurately determine exercise performance.

Description of Related Art

Many devices and methods are available for monitoring exercise performance. A significant drawback of existing devices and methods relates to inaccuracies in the speed values calculated using position information, such as information received by a GPS (Global Positioning System) receiver. That is, when monitoring running performance, for any given run, when a plot of the speed values obtained from such GPS information is viewed, there are often spikes in the plot. Sometimes, the spikes are obviously the result of positioning error, each seeming to indicate that the runner suddenly increased speed to an unreasonable, even humanly impossible level. This will lead to unrealistic values for the run, such as improbable values for maximum speed, fastest split time, total distance for the run, etc.

SUMMARY

One aspect of the present disclosure is related to a device for monitoring exercise performance and configured to be worn, held, or affixed to a limb of a user. The device for monitoring exercise performance comprises a position determining module operable to receive one or more signals, and configured to generate position data for a present exercise session of the user utilizing the one or more signals; a motion sensor configured to detect motion of the device and generate motion data for the present exercise session; and a processor coupled with the position determining module and the motion sensor. The processor is operable to calculate, based on the position data, at least one of speed, pace, and distance of the device to obtain at least one of speed, pace, and distance data throughout the present exercise session; calculate, based on the motion data, a limb motion of the user to obtain limb motion data throughout the present exercise session; determine, by analyzing the at least one of the speed, pace, and distance data, whether an inaccurate interval is present during the present exercise session, wherein the inaccurate interval represents an interval in the present exercise session during which the at least one of the speed, pace, and distance data exceeds a threshold; obtain a matching interval from the remainder of the present exercise session, from past exercise sessions, or from both the remainder of the present exercise session and the past exercise sessions, by comparing the limb motion data during the inaccurate interval with limb motion data from intervals with a same time duration as the inaccurate interval during the remainder of the present exercise session, the past exercise sessions, or from both the remainder of the present exercise session and the past exercise sessions; and replace at least one of the speed, pace, and distance data during the inaccurate interval with a corresponding at least one of speed, pace, and distance data of the matching interval.

Another aspect of the present disclosure is related to a method for monitoring exercise performance, wherein the method is performed by a device for monitoring exercise performance that is configured to be worn, held, or affixed to a limb of a user, the device for monitoring exercise performance comprising a position determining module, a motion sensor, and a processor coupled with the position determining module and the motion sensor. The method for monitoring exercise performance includes receiving, by the position determining module, one or more signals, and generating, by the position determining module, position data for a present exercise session of the user utilizing the one or more signals; detecting, by the motion sensor, motion of the device, and generating, by the motion sensor, motion data for the present exercise session; calculating, by the processor and based on the position data, at least one of speed, pace, and distance of the device to obtain at least one of speed, pace, and distance data throughout the present exercise session; calculating, by the processor and based on the motion data, a limb motion of the user to obtain limb motion data throughout the present exercise session; determining, by the processor and by analyzing the at least one of the speed, pace, and distance data, whether an inaccurate interval is present during the present exercise session, wherein the inaccurate interval represents an interval in the present exercise session during which the at least one of the speed, pace, and distance data exceeds a threshold; obtaining, by the processor, a matching interval from the remainder of the present exercise session, from past exercise sessions, or from both the remainder of the present exercise session and the past exercise sessions, by comparing the limb motion data during the inaccurate interval with limb motion data from intervals with a same time duration as the inaccurate interval during the remainder of the present exercise session, the past exercise sessions, or from both the remainder of the present exercise session and the past exercise sessions; and replacing, by the processor, at least one of the speed, pace, and distance data during the inaccurate interval with a corresponding at least one of speed, pace, and distance data of the matching interval.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, in the description herein and throughout the claims that follow, "around," "about," "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures or operations. Numerical quantities given herein are approximate, meaning that the term "around," "about," "approximately" or "substantially" can be inferred if not expressly stated, or meaning other approximate values.

In the following paragraphs, running is used as an example to describe the present disclosure. However, other forms of exercise can be monitored using the present disclosure. Examples of such other forms of exercise will be given below following the description related to running.

Figure 1:
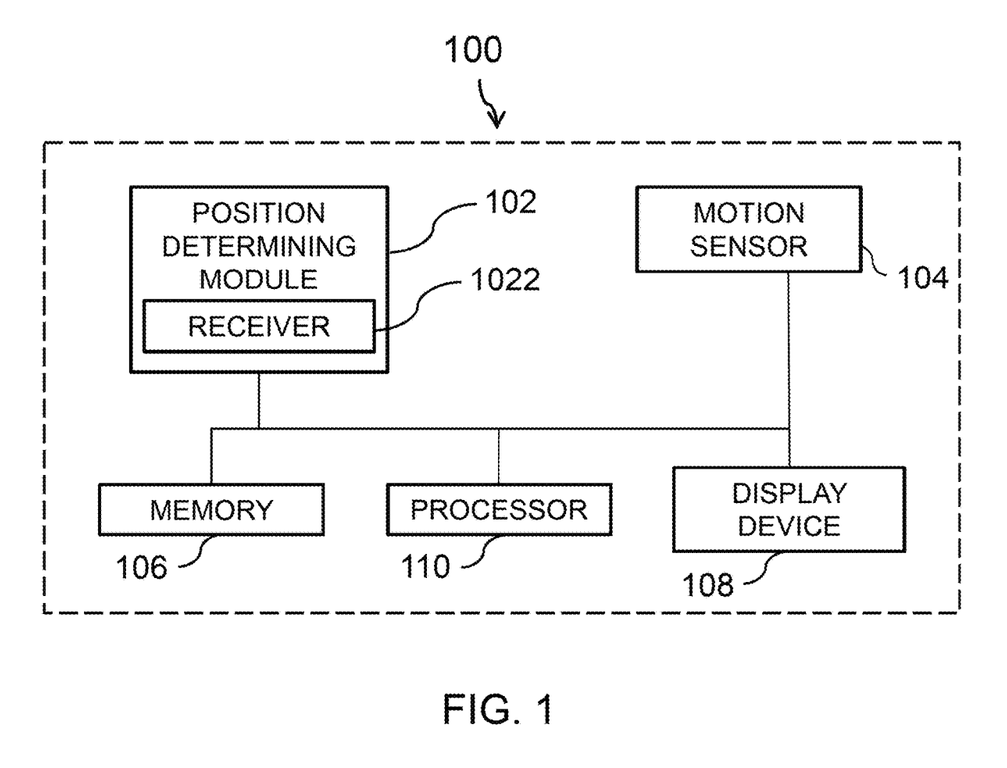
FIG. 1 is a schematic block diagram of a device for monitoring exercise performance in accordance with one embodiment of the present disclosure.

FIG. 1 is a schematic block diagram of a device 100 for monitoring exercise performance in accordance with one embodiment of the present disclosure. The device 100 comprises a position determining module 102, a motion sensor 104, a memory 106, a display device 108, and a processor 110.

The device 100 may be any kind of mobile device that is worn on the wrist (for example, a sports watch), or held in the hand (for example, a smartphone, a multimedia device, a media player, a handheld GPS device, a tablet computer, a personal digital assistant, a game device, etc.). Of course, the device 100 may also be held in an armband, or otherwise positioned in a relatively stationary manner anywhere on the arm during exercise.

The position determining module 102 is operable to receive one or more signals to calculate the position of the device 100 and track movement. The position may be a 2-D position (latitude and longitude) of the device 100, or 3-D position (latitude, longitude, and altitude) of the device 100.

In some embodiments, the position determining module 102 comprises a receiver 1022. In some embodiments, the receiver 1022 is a GPS receiver, and the position determining module 102 is operable to receive one or more signals from GPS satellites via the receiver 1022. In such embodiments, the receiver 1022 may lock on to the signal of at least three GPS satellites to calculate 2-D position, and four or more GPS satellites to determine 3-D position. In some embodiments, the 2-D position and the 3-D position are calculated by the position determining module 102. In other embodiments, the 2-D position and the 3-D position are calculated by the processor 110 using the signal data obtained by the receiver 1022.

Once the position of the device 100 and changes in the same are determined, other data can be calculated by the position determining module 102. In some embodiments, such other data is calculated by the processor 102. For example, speed and distance may be calculated using the position data of the device 100, in which the position data is determined as described above. Pace data, such as running pace, may also be calculated using the position data.

The motion sensor 104 detects motion of the device 100 and generates motion data, such as acceleration data. For example, when the device 100 is worn on the wrist of the user, held in the hand of the user, or held stationary anywhere on the arm of the user, the motion sensor 104 may detect arm motion of the user, that is, arm acceleration of the user.

The motion sensor 104 may comprise accelerometers, tilt sensors, inclinometers, gryoscopes, or combinations thereof. The motion sensor 104 may detect motion along one axis of motion or multiple axes of motion, such as the three orthogonal axes X, Y, and Z. The motion sensor 104 transmits motion data to the processor 110.

The memory 106 may include a read-only memory (ROM), a flash memory, a floppy disk, a hard disk, an optical disc, a flash drive, a tape, a database accessible from a network, or any storage medium with the same functionality that can be contemplated by persons of ordinary skill in the art to which this invention pertains. The memory 106 may store data calculated by the processor 110, and also data generated or detected by the position determining module 102 and the motion sensor 104. The memory 106 may also store data of graphs generated by the processor 110 using the position data obtained by the position determining module 102, and this graphical data may be retrieved by the processor for display on the display device 108. The memory 106 may also store data related to the motion data obtained by the motion sensor 104.

In some embodiments, all data calculated by the processor, data generated or detected by the position determining module 102 and the motion sensor 104, data of graphs generated by the processor 110, as discussed above, may be stored in the cloud, such as in the storage of a company that provides an exercise application for mobile devices. In such embodiments, the device 100 is configured to be Internet-abled. For example, the device 100 is configured to connect to the Internet through a cellular network, through Wi-Fi, etc. An example of data being stored in the cloud for subsequent retrieval will be given below.

The display device 108 is used to display data to a user, such as a graph as described above. The display device 108 may comprise a liquid crystal display (LCD), an organic light-emitting diode display (OLED), a cathode ray tube (CRT), a light-emitting diode (LED) display, an electroluminescent display (ELD), and so forth. In some embodiments, the display device 108 may have touch screen capabilities to allow a user to operate the device 100 by touching the display device 108 and performing gestures thereon.

The processor 110 obtains data from the position determining module 102, the motion sensor 104, the memory 106, and also the display device 108 (when the display device 108 has touch screen capabilities), and performs calculations and overall control of the device 100. The results of the calculations performed by the processor 110 may be stored in the memory 106 or stored in the cloud, and may be shown on the display device 108. The processor 110 may comprise a central processor, a digital signal processor (DSP), an image signal processor (ISP) and/or a microprocessor, but is not limited in this regard.

Figure 2:
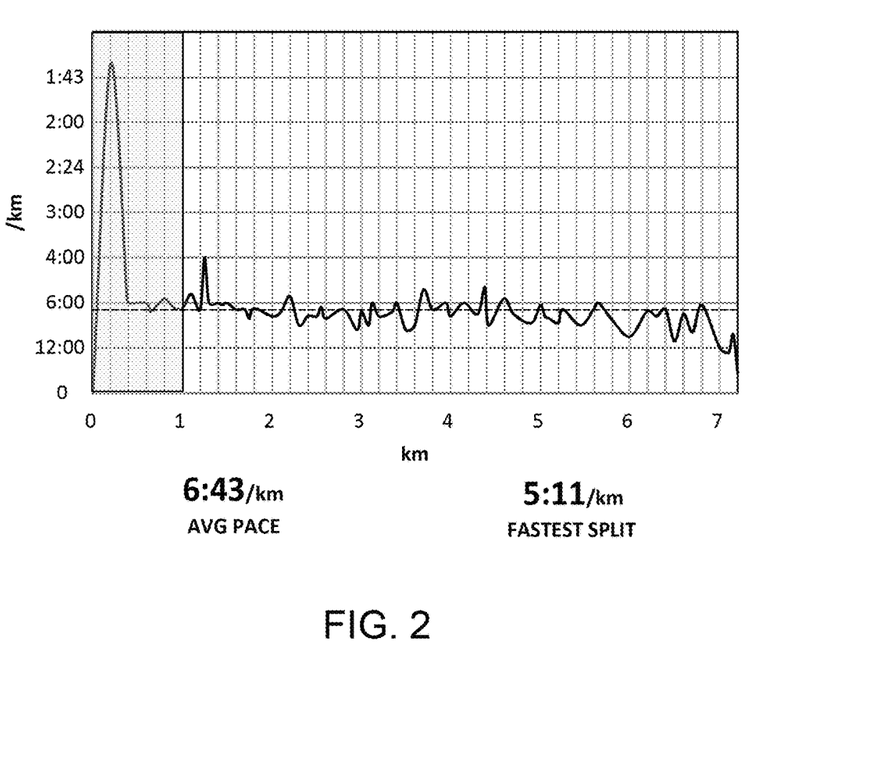
FIG. 2 is a graph of pace and distance values during a run obtained using GPS information.

In some embodiments, for any given run, the processor 110 obtains position data from the position determining module 102, then calculates speed and distance data, and possibly also pace data. In some embodiments, the speed and distance data (and possibly also the pace data) are calculated by the position determining module 102. The processor 110 then generates a graph as shown in FIG. 2 at the end of the run. For example, the user may press a "run complete" button on the device 100 (not shown), or may press an icon shown on the display device 108 when the display device 108 has touch screen capabilities.

As shown in FIG. 2, the graph of this particular run shows that the user ran slightly over 7 kilometers (km), and ran that distance at a pace of over 6 minutes per kilometer. In some embodiments, the processor 110 may calculate other data, such as average pace and fastest split, as shown in FIG. 2. For this run, the average pace was 6:43/km, and the fastest split was 5:11/km.

However, the graph shown in FIG. 2 shows something that is obviously inaccurate. That is, at the beginning of this run, the user supposedly ran at an impossible pace of faster than 1:43 per kilometer at one point, and maintained a very high pace for 400 meters or so. In this particular case, the fastest split of 5:11 per kilometer came in the first kilometer, as indicated by the shading in the graph associated with the first kilometer. It may be possible that this particular user has never run a kilometer in a time of 5:11. Moreover, because of this error at the beginning of the run, it is very possible that the total distance of 7.2 kilometers is also in error (i.e., the user ran less than this total distance). These erroneous values are all a result of the inaccuracy of the graph shown at the beginning of the run.

It is to be noted that the inaccuracies shown in FIG. 2 may be due to inaccuracies in the reception of the GPS signals and/or disturbances to the signals. Regardless of the cause, embodiments of the present disclosure address this problem of inaccurate speed, distance, and pace data calculated using the position data from the position determining module 102.

In some embodiments, the processor 110 obtains acceleration data from the motion sensor 104 and calculates an arm swing rate using the acceleration data. As described above, the device 100 may be worn on the wrist, held in the hand, or held stationary anywhere on the arm (such as in an armband). Acceleration data obtained by the motion sensor 104 can be analyzed by the processor 110 to obtain an arm swing rate. It is to be noted that since the acceleration data is obtained from one arm, the arm swing rate will be for one arm. However, this should not pose a problem since the arm swing rate will always be for one arm, and so comparisons with other runs will be performed using the same data of arm swing rate data from one arm.

It is noted at this point that, for most every runner, arm swing rate corresponds to the stride rate (or cadence). That is, for most every runner, the arm swing rate is the same as the stride rate. However, the actual running speed for any given stride rate varies from one runner to another because of stride length. For example, elite runners that are running neck-and-neck during a 10 k race (i.e., at the same speed) may have very different stride rates, such as 185 steps per minute (SPM) for one runner, 190 SPM for another runner, and 195 SPM for a third runner. This is possible because of the different stride lengths for different runners.

However, for any given (single) runner, a certain stride rate will translate into a certain speed for that runner. And since arm swing rate is equal to stride rate for most every runner, it may be stated that for any given runner, a certain arm swing rate will translate into a certain speed for that runner. This data is used in the present disclosure to correct inaccuracies in the calculated speed as discussed above, that is, to correct areas of spikes in pace and distance seen in a graph of pace and distance during a given run, such as the spike at the beginning of the run shown in FIG. 2.

In some embodiments, the processor 110 analyzes the pace and distance information, determines a duration during which the pace is reasonably assumed to be inaccurate (hereinafter "inaccurate interval"), and then replaces the pace and distance data during the inaccurate interval with pace and distance data of another segment of the run.

For example, in some embodiments, the processor 110 determines the inaccurate interval to be that portion of the run in which the pace was higher than what is possible for most average runners, such as the interval in which the pace was over 3 minutes per kilometer.

In some embodiments, the processor 110 determines the inaccurate interval to be that portion of the run in which the pace was higher than the average pace by a certain amount, such as 25% higher. In the example shown in FIG. 2, the average pace was 6:43/km, and so a pace that is 25% faster than this would be 5:02/km. Therefore, the inaccurate interval may be that time interval during which the average pace was faster than 5:02/km.

In some other embodiments, the processor 110 determines the inaccurate interval to be that portion of the run in which the pace was higher than an average of average paces of all past runs by that runner by a certain amount (for example, 25% faster as in the above example), or higher than an average of average paces of all matched runs by that runner by a certain amount (e.g., 25% faster). In the case of matched runs, since the processor 110 receives position data from the position determining module 102, it is easy for the processor 110 to determine if any past runs match the present run. In some embodiments, one run is assumed to match another run when the routes are substantially the same. For example, two runs are assumed to match when the routes and distances are the same by a certain threshold of, say, 95%. In some embodiments, the processor 110 accesses the memory 106 to obtain this data of past runs. In some other embodiments, the processor 110 obtains this data of past runs from the cloud.

Moreover, since the average pace of the present run may be inaccurate due to the inaccuracies related to the spike in the graph of FIG. 2 as discussed above (i.e., the spike may affect the overall average pace, especially for runs that are of a short distance), it may be advantageous to use this past data of the average pace for all matched runs.

In still other embodiments, since runners improve over time and sometimes even deteriorate in performance, an average of the average paces for all matched runs that have occurred over a certain duration (e.g., over the last six months) may be used.

Once the inaccurate interval has been determined by the processor 110, the processor 110 determines the average arm swing rate during the inaccurate interval. The processor 110 then analyzes the remainder of the present run to obtain an interval during the run in which an average arm swing rate most closely matches the average arm swing rate during the inaccurate interval (hereinafter referred to as a "matching interval"). In some embodiments, the matching interval has the same time duration as the time duration of the inaccurate interval. Once such a matching interval is found, the processor 110 replaces data of the inaccurate interval with data of the matching interval. For example, the processor 110 replaces the speed, pace, and distance data during the inaccurate interval with the speed, pace, and distance data of the matching interval.

For example, if the inaccurate interval is from 5 seconds to 65 seconds at the beginning of the run (for a total of 60 seconds), the processor 110 finds the matching interval by comparing data from every 60-second interval starting from the interval from 66 seconds to 121 seconds, 67 seconds to 122 seconds, and so on. As another example, the processor 110 finds the matching interval by comparing data from every 60-second interval starting at the beginning of each new minute after the inaccurate interval, such as every 60-second interval starting with the second or third minute in FIG. 2, whichever is the first full minute after the inaccurate interval.

In some embodiments, data from both the present run and past runs is used to find the matching interval in the same way as is found with the present run, as discussed above. That is, information of all past runs, all matched runs, some of the past runs, or some of the matched runs as discussed above may be used to obtain the matching interval.

In some embodiments, an acceleration pattern from the inaccurate interval is compared with acceleration patterns from the remainder of the run and/or from past runs. For example, an acceleration pattern may be represented on a graph and appear roughly as a sine wave, and the sine wave from the inaccurate interval is compared with sine waves from the remainder of the run and/or from past runs to obtain the matching interval.

Figure 3:
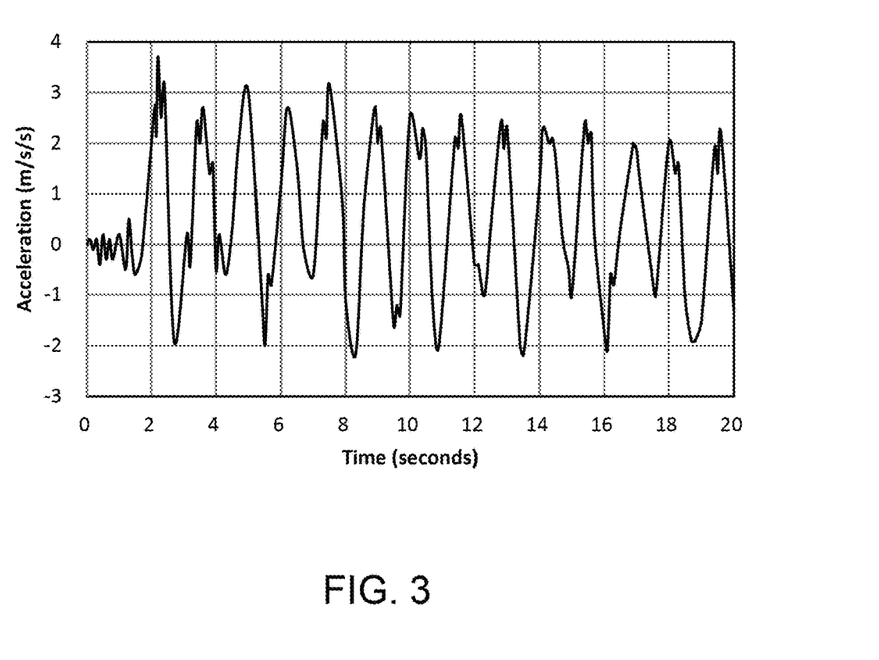
FIG. 3 is a graph of swing acceleration along the Y-axis obtained using a smartphone and a widely available smartphone application.

FIG. 3 is a graph of swing acceleration using a smartphone and an application, such as AndroSensor or SPARKvue. To obtain the data, a smartphone was fixed to a swing chain, and a user began to swing while Y-axis acceleration was recorded. Data was collected for about 20 seconds. In a similar manner, an acceleration pattern may be obtained when the device 100 is a mobile device worn on the wrist (for example, a sports watch), held in the hand (for example, a personal digital assistant), or held in an armband (for example, a smartphone held in an armband).

Moreover, such an acceleration pattern from the inaccurate interval may be compared with acceleration patterns form the remainder of the run and/or from past runs. For example, in some embodiments, a period, frequency, and amplitude of the sinusoidal acceleration pattern from the inaccurate interval may be compared with periods, frequencies, and amplitudes of the sinusoidal acceleration patterns form the remainder of the run and/or from past runs to obtain the matching interval. Other ways in which sine waves can be compared may be used, and the present disclosure is not limited in this regard.

Since it is possible for the arm swing rate at one section of a run to be the same as the arm swing rate at another section of the run when the actual speeds for the two sections to be different, acceleration patterns may be used in some embodiments. For example, when running up a hill, the arm swing rate may be high, even though the running speed is slow. If this is compared with another section of the run where there is no hill using simply the arm swing rate, a matching interval that is not an ideal replacement for the inaccurate interval may be used to replace the data of the inaccurate interval. To avoid this potential problem, acceleration patterns are compared to obtain the matching interval.

Figure 4:
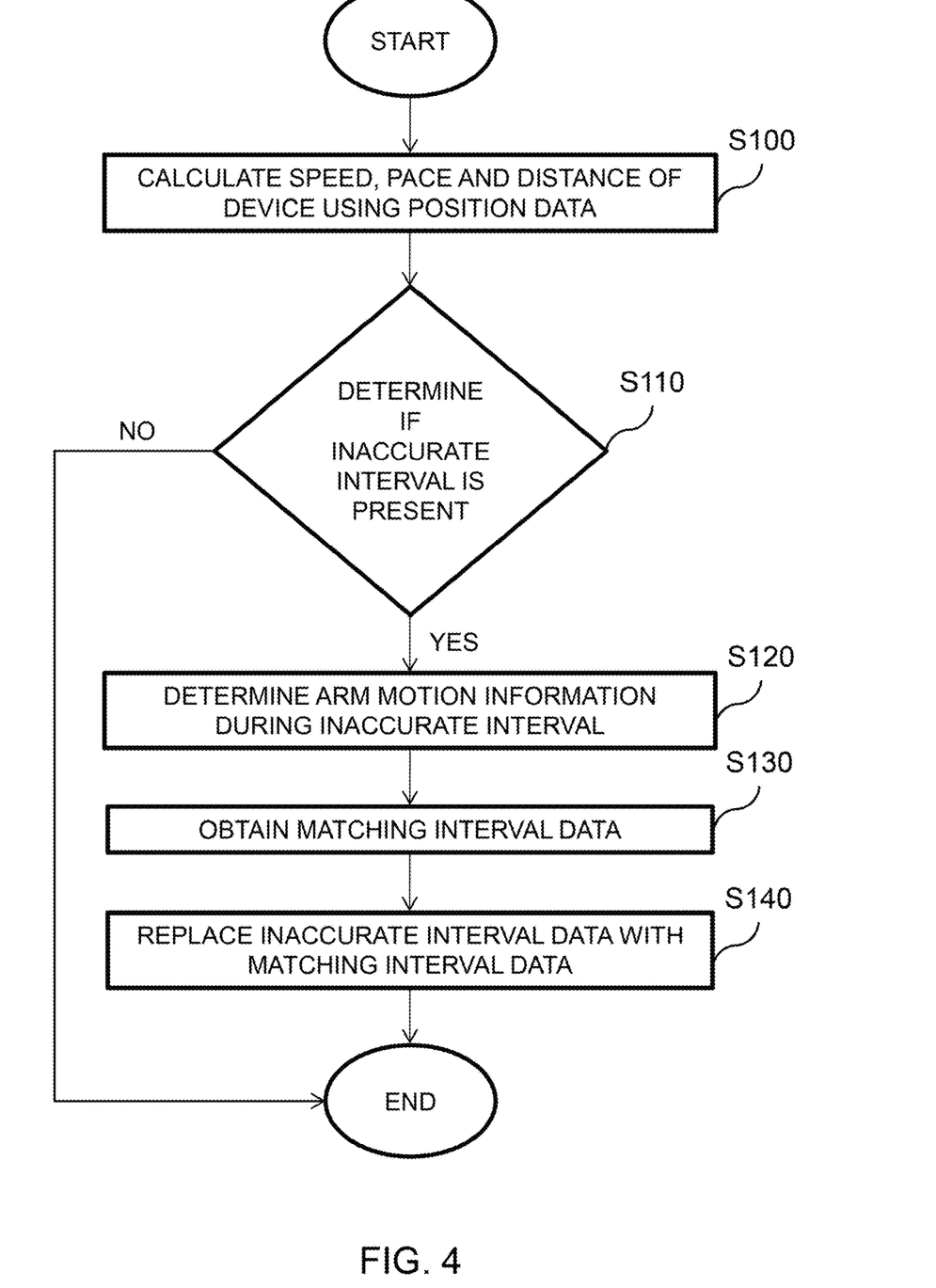
FIG. 4 is a flowchart of a method for monitoring exercise performance in accordance with one embodiment of the present disclosure.

FIG. 4 is a flowchart of a method for monitoring exercise performance in accordance with one embodiment of the present disclosure.

In some embodiments, the method for monitoring exercise performance may be performed by the device 100 for monitoring exercise performance shown in FIG. 1. However, the present disclosure is not limited in this regard, and the method may be performed by various different types of devices.

In some embodiments, when performed by a device, the device will have processing capabilities and some form of memory, as well as the ability to determine position and detect acceleration. In some other embodiments, at least some of the data used by the device will be from memory which is cloud-based, in which case the device will have the ability to connect to the Internet, such as through a cellular network, though Wi-Fi, etc.

For convenience of explanation, the method for monitoring exercise performance will be described with reference to the device 100 for monitoring exercise performance described with reference to FIGS. 1 and 2.

Referring to FIG. 4, together with FIGS. 1 and 2, the method for monitoring exercise performance comprises steps S100-S140.

First, in step S100, speed, pace, and distance of the device 100 are calculated using the position data of the device. The speed, pace, and distance of the device 100 may be calculated by the position determining module 102 or by the processor 110, as described above. Other details related to calculating the position data of the device 100 for monitoring exercise performance may be ascertained from the above paragraphs and will not be repeated.

Next, in step S100, the processor 110 analyzes the speed, pace, and distance data, and makes a determination as to whether an inaccurate interval is present in the present run.

"The present run" may refer to a run in progress or a run just completed by the user. To simplify the explanation, it will be assumed that the "present run" refers to a run just completed.

If there is no accurate interval in the present run, the process ends. On the other hand, if an inaccurate interval is present in the present run, in step S120, the processor 110 determines arm motion information during the inaccurate interval using the motion data (e.g., using acceleration data) obtained by the motion sensor 104. For example, the arm motion information may be the arm swing rate of the user during the inaccurate interval, or arm acceleration data, as described above.

Next, in step S130, the processor 110 obtains a matching interval from the remainder of the run (i.e., the portion of the run outside the inaccurate interval), and/or from a previous run. Details of analyzing matched runs may be obtained from the above paragraphs and will not be repeated.

Subsequently, in step S140, the processor replaces data of the inaccurate interval with data from the matching interval.

In the embodiments described above, the sport of running is used exclusively to explain the present disclosure. However, it is to be noted that the present disclosure may find other applications. For example, the device 100 described with reference to FIGS. 1 and 2, and the method described above with reference to FIG. 4 may be used to monitor swimming performance. Since many devices equipped with position determining capabilities are used also for swimming, and since the stroke rate in swimming is also an indication of swimming speed for a particular swimmer, the features as described above may also be used in swimming.

Likewise, it is possible to apply the concepts of the present disclosure to other sports, such as cycling. In the case of cycling, the device could be worn on the leg of the user. In some embodiments, an auxiliary device could be worn on the leg of the user to obtain pedal data, and this data could be transmitted to a main device worn on the wrist of the user, held in the hand, held in an armband, etc. by short-range communication (e.g., Bluetooth communication).

Hence, while a "run," "given run," etc. were used to describe operation of the present disclosure, in view of the fact that the present disclosure may find other applications in other sports, as set forth above, "exercise session" may be used to more generally describe the present disclosure. Moreover, while "arm swing rate" and "arm acceleration" were used while describing the present disclosure when using the running example, "limb swing rate" and "limb acceleration" may be used to take into account how leg movement information may be used when the present disclosure is applied to some sports. "Limb motion" may be used to generally refer to both of these options.

In the present disclosure described above, by replacing data from the inaccurate interval with data from a matching interval, unreasonable data is replaced with more reasonable data. As a result, highly accurate values for maximum speed, average pace, fastest split time, total distance for the run, etc. may be obtained.

Although the present invention has been described in considerable detail with reference to certain embodiments thereof, other embodiments are possible. Therefore, the scope of the appended claims should not be limited to the description of the embodiments contained herein.

What is claimed is:

1. A device for monitoring exercise performance and configured to be worn, held or affixed to a limb of a user, the device for monitoring exercise performance comprising:

a position determining module comprising a global positioning system (GPS) receiver, wherein the GPS receiver locks on to GPS satellite signals of a plurality of GPS satellites, and the position determining module is configured to generate position data for a present exercise session of the user utilizing the GPS satellite signals;

a motion sensor configured to detect motion of the device and generate motion data for the present exercise session; and a processor coupled with the position determining module and the motion sensor, the processor operable to:

calculate, based on the position data, at least one of speed, pace, and distance of the device throughout the present exercise session;

calculate, based on the motion data, a limb motion of the user to obtain limb motion data throughout the present exercise session;

calculate, utilizing the pace, an average pace during the present exercise session;

determine if the pace at any point during the present exercise session exceeds the average pace by a predetermined percentage threshold;

in response to determining that the pace at any point during the present exercise session exceeds the average pace by the predetermined percentage threshold, determine a time interval during which the pace exceeds the predetermined percentage threshold to obtain an inaccurate interval, wherein the inaccurate interval is indicative of an inaccuracy in the pace during the inaccurate interval;

obtain a matching interval from the remainder of the present exercise session by comparing the limb motion data during the inaccurate interval with limb motion data from intervals with a same time duration as the inaccurate interval during the remainder of the present exercise session; and replace at least one of the speed, pace, and distance during the inaccurate interval with a corresponding at least one of speed, pace, and distance of the matching interval, wherein the speed, pace, and distance of the matching interval to replace the speed, pace, and distance during the inaccurate interval are calculated based on the position data generated utilizing GPS satellite signals.

2. The device for monitoring exercise performance of claim 1, wherein the motion sensor comprises an accelerometer, the motion detected by the motion sensor is acceleration, and the motion data is acceleration data, wherein the present exercise session is a present run, and the limb motion calculated by the processor is an arm swing rate of the user during the present run.

3. The device for monitoring exercise performance of claim 2, wherein the processor obtains the matching interval by comparing an average arm swing rate of the user during the inaccurate interval with average arm swing rates of the user during intervals of the same duration as the inaccurate interval from the remainder of the present run.

4. The device for monitoring exercise performance of claim 1, wherein the motion sensor comprises an accelerometer, the motion detected by the motion sensor is acceleration, and the motion data is acceleration data, wherein the limb motion calculated by the processor is an acceleration pattern associated with the limb of the user during the present exercise session.

5. The device for monitoring exercise performance of claim 4, wherein the processor obtains the matching interval by comparing an acceleration pattern during the inaccurate interval, with acceleration patterns during intervals of the same duration as the inaccurate interval from the remainder of the present exercise session.

6. A method for monitoring exercise performance, wherein the method is performed by a device for monitoring exercise performance that is configured to be worn, held, or affixed to a limb of a user, the device for monitoring exercise performance comprising a position determining module, a motion sensor, and a processor coupled with the position determining module and the motion sensor, the positioning determining module comprising a global positioning (GPS) receiver, the method for monitoring exercise performance comprising:

locking on to, by the GPS receiver of the position determining module, GPS satellite signals of a plurality of GPS satellites, and generating, by the position determining module, position data for a present exercise session of the user utilizing the GPS satellite signals;

detecting, by the motion sensor, motion of the device, and generating, by the motion sensor, motion data for the present exercise session;

calculating, by the processor and based on the position data, at least one of speed, pace, and distance of the device throughout the present exercise session;

calculating, by the processor and based on the motion data, a limb motion of the user to obtain limb motion data throughout the present exercise session;

calculating, by the processor and utilizing the pace, an average pace during the present exercise session;

determining, by the processor, if the pace at any point during the present exercise session exceeds the average pace by a predetermined percentage threshold;

in response to determining that the pace at any point during the present exercise session exceeds the average pace by the predetermined percentage threshold, determining, by the processor, a time interval during which the pace exceeds the predetermined percentage threshold to obtain an inaccurate interval, wherein the inaccurate interval is indicative of an inaccuracy in the pace during the inaccurate interval;

obtaining, by the processor, a matching interval from the remainder of the present exercise session by comparing the limb motion data during the inaccurate interval with limb motion data from intervals with a same time duration as the inaccurate interval during the remainder of the present exercise session; and replacing, by the processor, at least one of the speed, pace, and distance during the inaccurate interval with a corresponding at least one of speed, pace, and distance of the matching interval, wherein the speed, pace, and distance of the matching interval to replace the speed, pace, and distance during the inaccurate interval are calculated based on the position data generated utilizing GPS satellite signals.

7. The method for monitoring exercise performance of claim 6, wherein:

the motion sensor comprises an accelerometer, the motion detected by the motion sensor is acceleration, the motion data is acceleration data, and the present exercise session is a present run;

calculating the limb motion by the processor comprises calculating an arm swing rate of the user during the present run; and obtaining the matching interval by the processor comprises comparing an average arm swing rate of the user during the inaccurate interval with average arm swing rates of the user during intervals of the same duration as the inaccurate interval from the remainder of the present run.

8. The method for monitoring exercise performance of claim 6, wherein:

the motion sensor comprises an accelerometer, the motion detected by the motion sensor is acceleration, and the motion data is acceleration data;

calculating the limb motion, by the processor comprises calculating an acceleration pattern associated with the limb of the user during the present exercise session; and obtaining the matching interval by the processor comprises comparing an acceleration pattern during the inaccurate interval with acceleration patterns during intervals of the same duration as the inaccurate interval from the remainder of the present exercise session.

9. The device for monitoring exercise performance of claim 1, further comprising a display device, wherein the processor is further operable to generate a graph on the display device at an end of the present exercise session, and wherein the processor generates the graph using the calculated pace and distance to show the pace and distance on the graph.

10. The device for monitoring exercise performance of claim 9, wherein the display device is a touch screen display device, and the processor generates the graph on the display device in response to the user pressing an icon on the display device.

11. The device for monitoring exercise performance of claim 9, further comprising a run complete button, wherein the processor generates the graph on the display device in response to the user pressing the run complete button.

12. The device for monitoring exercise performance of claim 1, wherein the motion sensor comprises an accelerometer, the motion detected by the motion sensor is acceleration, the motion data is acceleration data, and the device is a wrist-worn sports watch or a handheld device; and wherein obtaining a matching interval by the processor comprises:

determining, utilizing the acceleration data, an average arm swing rate of the user during the inaccurate interval to obtain an inaccurate interval average arm swing rate;

analyzing, utilizing the acceleration data, an average arm swing rate of each time interval outside of the inaccurate interval during the present exercise session, wherein said each time interval is of equal time duration as the inaccurate interval;

determining which of the average arm swing rate of each time interval outside the inaccurate interval most closely matches the inaccurate interval average arm swing rate; and setting the time interval having the average arm swing rate that most closely matches the inaccurate interval arm swing rate as the matching interval.

13. The method for monitoring exercise performance of claim 12, wherein the inaccurate interval is from x seconds to y seconds in the present exercise session, and the average arm swing rate is analyzed for each time interval equal to y seconds minus x seconds starting from y+1 seconds and continuing by adding an additional second to y until the end of the present exercise session is reached.

14. The method for monitoring exercise performance of claim 12, wherein the inaccurate interval is from x seconds to y seconds in the present exercise session, and the average arm swing rate is analyzed for each time interval equal to y seconds minus x seconds starting at the beginning of each subsequent minute mark after the inaccurate interval until the end of the present exercise session is reached.

15. The method for monitoring exercise performance of claim 6, wherein the motion sensor comprises an accelerometer, the motion detected by the motion sensor is acceleration, the motion data is acceleration data, and the device is a wrist-worn sports watch or a handheld device; and
   wherein obtaining a matching interval by the processor comprises:
   determining, utilizing the acceleration data, an average arm swing rate of the user during the inaccurate interval to obtain an inaccurate interval average arm swing rate;
   analyzing, utilizing the acceleration data, an average arm swing rate of each time interval outside of the inaccurate interval during the present exercise session, wherein said each time interval is of equal time duration as the inaccurate interval;
   determining which of the average arm swing rate of each time interval outside the inaccurate interval most closely matches the inaccurate interval average arm swing rate; and
   setting the time interval having the average arm swing rate that most closely matches the inaccurate interval arm swing rate as the matching interval.

16. The method for monitoring exercise performance of claim 15, wherein the inaccurate interval is from x seconds to y seconds in the present exercise session, and the average arm swing rate is analyzed for each time interval equal to y seconds minus x seconds starting from y+1 seconds and continuing by adding an additional second to y until the end of the present exercise session is reached.

17. The method for monitoring exercise performance of claim 15, wherein the inaccurate interval is from x seconds to y seconds in the present exercise session, and the average arm swing rate is analyzed for each time interval equal to y seconds minus x seconds starting at the beginning of each subsequent minute mark after the inaccurate interval until the end of the present exercise session is reached.

* * * * *